June 18, 1935.  B. WALKER  2,005,173
VEHICLE LIFTING AND TRAVERSING DEVICE
Filed April 5, 1932   4 Sheets-Sheet 1

INVENTOR.
Brooks Walker

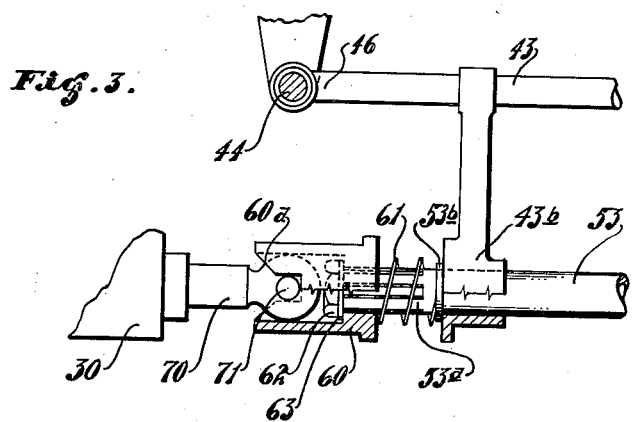
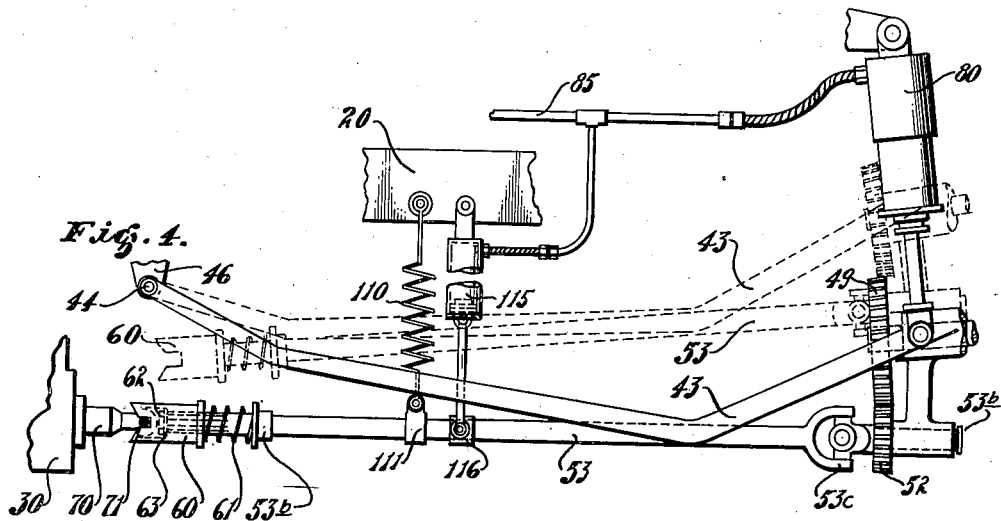

June 18, 1935.    B. WALKER    2,005,173
VEHICLE LIFTING AND TRAVERSING DEVICE
Filed April 5, 1932    4 Sheets-Sheet 3

INVENTOR
Brooks Walker

INVENTOR.
Brooks Walker

Patented June 18, 1935

2,005,173

UNITED STATES PATENT OFFICE 2,005,173

VEHICLE LIFTING AND TRAVERSING DEVICE

Brooks Walker, Piedmont, Calif.

Application April 5, 1932, Serial No. 603,317

9 Claims. (Cl. 180—1)

My invention relates to vehicle lifting and traversing devices and particularly to devices of this type which employ the spare tire or spare wheel to lift the usual ground engaging wheels at one end of the vehicle out of contact with the ground. My invention further relates to improvements in this type of mechanism whereby two spare tires may be carried at the rear of the vehicle, and to a construction whereby one of said spare tires may be removed for interchange with one of the normally used wheels of the vehicle in the event of a flat tire or other cause. My invention further relates to improvements in the driving mechanism for such devices in general and particularly to those of the class described in my co-pending application entitled Vehicle lifting and traversing device, Serial No. 535,380, filed May 6, 1931, and in my co-pending application entitled Vehicle lifting and traversing device, Serial No. 600,126 filed March 21, 1931.

The main objects of my invention are: to provide a lifting and traversing device for a vehicle which will allow the carrying of two spare tires at the rear end of a vehicle in which construction at least one of said spare tires is used for ground engagement to support and/or traverse said vehicle; to provide a construction whereby the driving mechanism for rotating said spare tire is simplified and made more practical; to provide means whereby both of said spare tires may be lowered into ground engagement, so that the tire loading per tire will not exceed the normal loading; to provide means whereby the two wheels may be stored in their retracted position in axial alinement with each other and at the same time be capable of swinging down into a vehicle lifted position out of axial alinement with each other; to provide a two point suspension for the elevated end of the vehicle; to provide a telescoping type of fluid cylinder lift so that a long stroke may be obtained without the necessity of having a cylinder extend unduly high relative to the chassis in order that the spare tires may be fully retracted; to provide means whereby the axis of the spare tires may occupy a considerable angle relative to the horizontal plane of the vehicle when said spare tires are in their retracted position and yet assume a vehicle raised position substantially perpendicular to the road surface; to provide means whereby automatic engagement may be made with a driving unit on the vehicle rear axle or differential housing which will not necessitate a continual connection between said axle housing and the spare tire mounting when said spare tires are in their retracted position, and to provide a more suitable construction for forming said connection when said spare tires are at a considerable longitudinal distance from said rear axle than was hitherto possible.

Other objects and features of novelty of my invention will be either specifically pointed out or will become apparent when referring, for a better understanding of my invention, to the following description in conjunction with the accompanying drawings, wherein:

Fig. 1 represents a side elevation view, partly in section, through section 1—1 of Fig. 2 which illustrates the rear portion of a motor vehicle chassis incorporating one form which my invention may assume wherein the rear wheels of the vehicle are shown in their lifted position supported on two spare tires in tandem relation to each other. The dotted lines illustrate the retracted position of the spare tires.

Fig. 3 is an enlarged fragmentary view, partly in section, showing the details of construction which may be employed in the means for connecting the drive shaft of the motor vehicle with the drive shaft of the spare wheels shown in their engaged position.

Fig. 4 is a fragmentary view of an alternative driving connection which may be employed instead of the construction illustrated in Fig. 1 in order that a greater ground clearance can be attained by the forward end of the drive shaft for the spare tires when such spare tires are in their inactive position.

Figure 1:
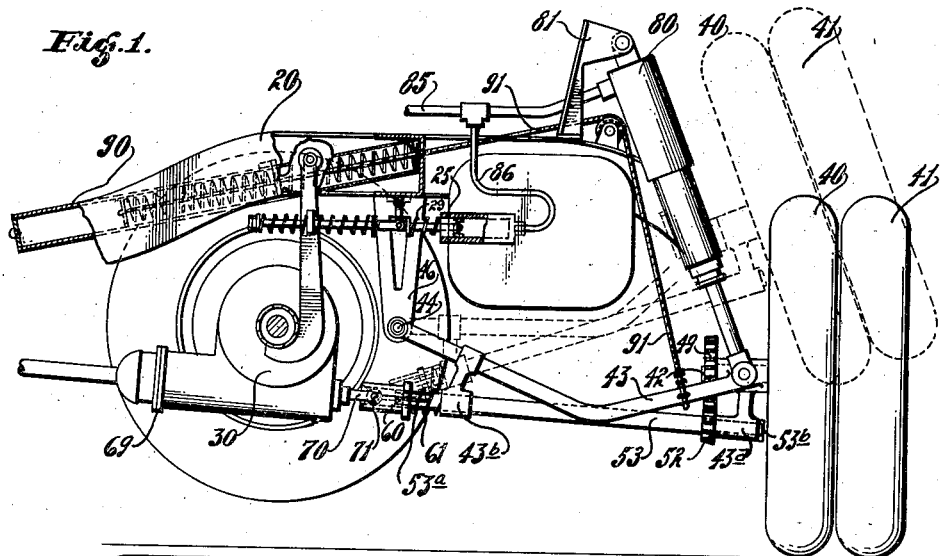

Referring to the accompanying drawings in which like numerals of reference refer to corresponding parts in the various views in Figs. 1, 2, 3 and 4, I have illustrated a vehicle frame 20, a rear axle housing 30 and two spare tires 40 and 41 respectively. It is assumed that the rear axle 30 is attached to the chassis 20 by any convenient resilient member not here illustrated. The spare tires 40 and 41 are rotatively mounted on the extension of axle 42 which carries a suitable hub for mounting two spare tires and spare wheels if demountable wheels are used. The axle 42 is suitably bearinged for rotation in a sub-frame 43 which is here illustrated in substantially A-shape being pivoted at its opposite ends to the vehicle frame by means of the bolts 44, 45 and the brackets 46 and 47. A gear 49 is rigidly mounted on the forward end of the axle 42 and is arranged in meshing relationship to a gear 52, which gear 52 is rigidly mounted on the shaft 53. One end of the shaft 53 is suitably bearinged for rotation in the arm 43a of the sub-frame 43. A suitable thrust collar or bearing 53b is preferably carried at the rear end of the shaft 53, thereby holding gear 52 in axial alignment with gear 49. The forward end of shaft 53 is suitably bearinged for rotation in the cross arm 43b of the sub-frame 43. A spline 53a is preferably cut on the forward end of the shaft 53, on which spline is slidably mounted a clutch member 60, which clutch member is yieldably urged forward by a spring 61, one end of which spring bears on said clutch and the other end on a collar 53b, which collar is preferably rigidly attached to the shaft 53. A nut 62 and a washer 63 prevents the clutch 60 from being forced off the spline by the spring 61.

The rear axle housing 30 preferably contains a drive of the worm or hypoid type wherein a through connection 70 may be made in extension of the pinion shaft 69. However shaft 70 may be driven from an auxiliary pinion from the master gear; or in the case of a rear motor drive vehicle, the shaft 70 may be a transmission shaft or any other suitable shaft located at the rear of the vehicle and adapted to be rotated in two directions by the vehicle transmission and also preferably to be under control of the vehicle brakes. Shaft 70 preferably carries a ball at its rear end as illustrated, and with a pin 81 extending therethrough, which pin 71 is adapted to be engaged by the jaw 60a of the clutch 60. However, in this connection any suitable type of clutch may be employed wherein a driving connection can be readily attained between two shafts in axial alignment. This type of connection is quite superior to the connection illustrated in the Perquet patent, Number 1,651,727, dated December 6, 1927 wherein a gear engagement is made by shafts in non-axial alignment, and consquently a side tooth load reaction will be encountered, which adds difficulties to a connection between an axle and a unit mounted on a vehicle frame. This invention further offers some improvement over the construction illustrated in Figure 16 of my co-pending application, Serial Number 535,380, previously referred to. By the construction of this invention no motion is required of the shaft 53 or the spline 53a when the spare tires are in their inactive position and the vehicle is in normal operation on the highway with a relative motion between the axle 20 and the frame 20. Axle hooks 21 and 22 are pivoted to the frame and are actuated by the hydraulic cylinder 25 through the rotating cross rod 26, the arms 27 and 28 and the connecting links 23 and 24 respectively. A telescoping cylinder 80 is pivotally attached to a member 81, which last mentioned member is rigidly attached to the vehicle frame 20 and may form a cross member thereof. A fluid circuit such as is employed in my last referred to co-pending application may be used in connection with the construction herein illustrated. The fluid pressure that is used to actuate the telescoping cylinder 80 is admitted to the pipe 85 from any suitable fluid pump, preferably driven by the vehicle motor.

A spring 90 continually acts through the cable 91 or any other suitable connection to retract the spare tires 40 and 41 together with their associated mechanism to their inactive position as shown in dotted line. This spring preferably exerts sufficient force to retain the wheels in their inactive position with a sufficient safety factor to prevent motion when the vehicle encounters bumps and to prevent rattles.

When fluid is admitted to pipe 85 to effect the lowering of said spare tire against the action of spring 90 and against the weight of the car, this same fluid pressure through the pipe 86 acts on the cylinder 25 to cause its associated piston to act so as to engage the axle hooks 21 and 22 with the rear axle to cause said axle to move with the vehicle frame. The spring 29 acts to retract the hooks 20 and 21 when there is relatively no fluid pressure within the cylinder 25, which condition exists when the spare tires are in their retracted position. The axle hooks 21 and 22 being pivoted to the vehicle frame 20 support the axle housing 30 in a positive position relative to the vehicle frame when said axle housing is in its lifted position. The positive positioning of the clutch 60 through its supporting mechanism also positively locates said clutch in a fixed position relative to the vehicle frame so that alignment between the shaft 70 and the clutch 60 is readily maintained. The shape of the clutch and the extension of the shaft 70 are of such form as to maintain a driving connection in the event of slight misalignment. The clutch 60 is axially slidable on the spline 53a so that in the event of non-alignment between the jaw 60a and the pin 71, the spring 61 would be compressed until a partial rotation of the shaft 70 or the clutch 60 would allow engagement to be effected by the spring 61.

The advantage of using a telescoping cylinder is the reduction of occupied space when the ground engaging members are in their retracted position. In this instance the hydraulic cylinder is allowed to be placed behind the rear elevation view of the spare tire, which eliminates it from rear view of the car and allows more complete blending with body lines. In connection with a telescoping cylinder, it is practically impossible to make such a cylinder double acting. To benefit further the looks of the car I have placed spring 90 underneath the vehicle body in an inconspicuous place and have connected it to the wheels by means of a flexible cable, which is inconspicuous and which can be readily covered. From actual experience I find that a spring such as 90 must be capable of storing in the neighborhood of 1,000 foot pounds of energy through its working stroke and still maintain a very substantial initial load. Because of the resulting dimension of spring 90, it is highly advisable to place this spring out of sight.

In Figure 4 I have illustrated a modified form of drive which may be used in place of the drive shaft of the previous figures. In this construction I have illustrated the gears 49 and 52 which drive the auxiliary wheel in a manner similar to Figures 1 and 2. The drive shaft 53 for the parking wheel is in this case connected to the driving gears by means of a universal joint 53C and is not carried at its forward end in the cross arm 43B, but is supported by means of a spring 110, one end of which is fastened to the vehicle frame 20 and the other end of which is fastened to a bearing 111 through which the shaft 53 is suitably bearinged for rotation. An auxiliary cylinder 115 is likewise connected between the frame 20 and a bearing 116 on the shaft 53. I have illustrated bearings 111 and 116 as separate in this instance though it is to be understood that the spring and the piston rod can both be connected to the same bearing if advisable. The cylinder 115 is connected with the pipe 85 which admits fluid under pressure to the cylinder 80 as previously described. By this connection it will be seen that as soon as pressure is admitted through pipe 85 the piston in the cylinder 115 will force the shaft 53 down until the piston strikes the end of the cylinder. The bearing between the upper end of the cylinder and the frame 20 allows the cylinder only fore and aft motion and thereby positions the shaft 53 so as to limit its travel to a vertical plane through the vertical longitudinal center line or a vertical plane through the center line of the shaft 70 which might be off the vertical center line. In this position the clutch 115 will be moved downwardly so that the resulting motion caused by the arcuate swinging of the universal joint 53 during the lowering operation of the wheel will cause the clutch 63 to engage the shaft 70 as illustrated in solid lines. The advantage of this construction is the resulting increased ground clearance of the clutch 60 and the forward end of the shaft 53 in the inactive position. In the case where the shaft 70 is an extension of a worm drive a fixed position of the elevation of the clutch 60 relative to the vehicle frame, which would engage the axle when supported on the axle hooks, might prove too low when the vehicle is heavily loaded and the spare wheels are in their inactive position. By this construction, however, the clutch 60 and the shaft 53 may be raised to any desired ground clearance in the inactive position and still operate satisfactorily as a driving means for rotating the spare wheel when the vehicle is supported thereon. It is preferable that the tension of the spring 110 is such that the piston within the cylinder 115 will be fully extended before the piston starts downward within the cylinder 80.

Figure 2:
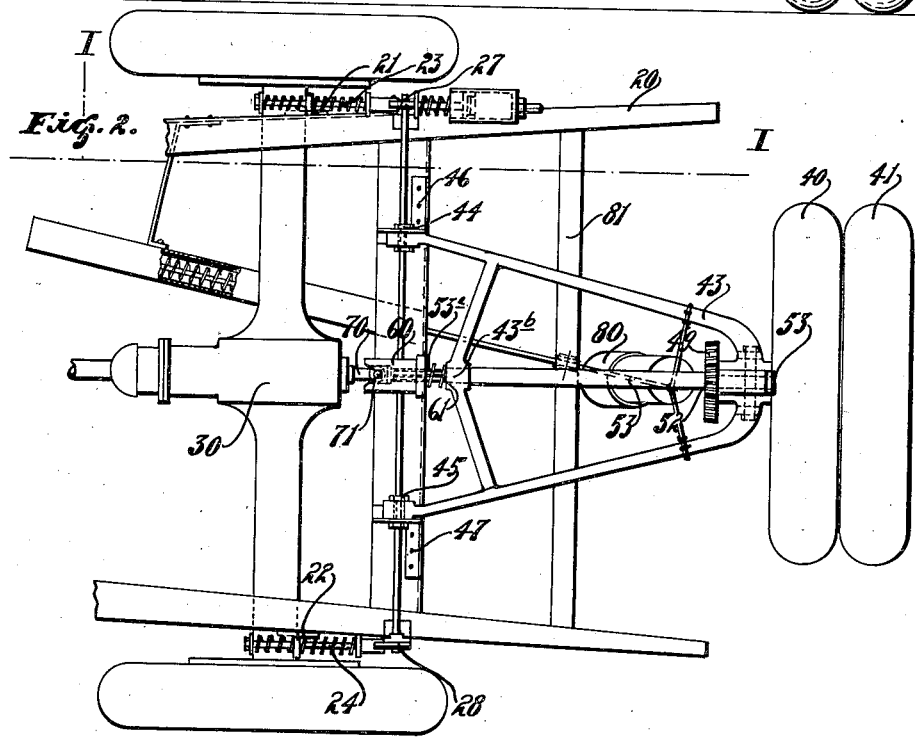
Fig. 2 is a bottom plan view of the rear portion of a motor vehicle incorporating the invention illustrated in Fig. 1, with the fuel tank removed to clarify the construction of the invention.
Figure 5:
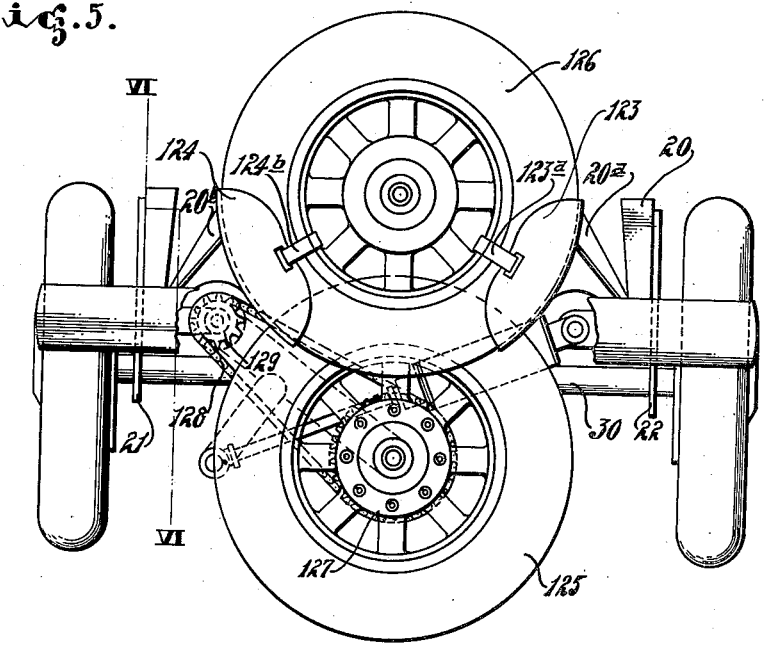
Fig. 5 is a partially cut away view showing the rear end of a motor vehicle incorporating another form of my invention which shows one only of the spare tires lowered into ground engagement and supporting the rear wheels of said vehicle out of ground engagement.
Figure 6:
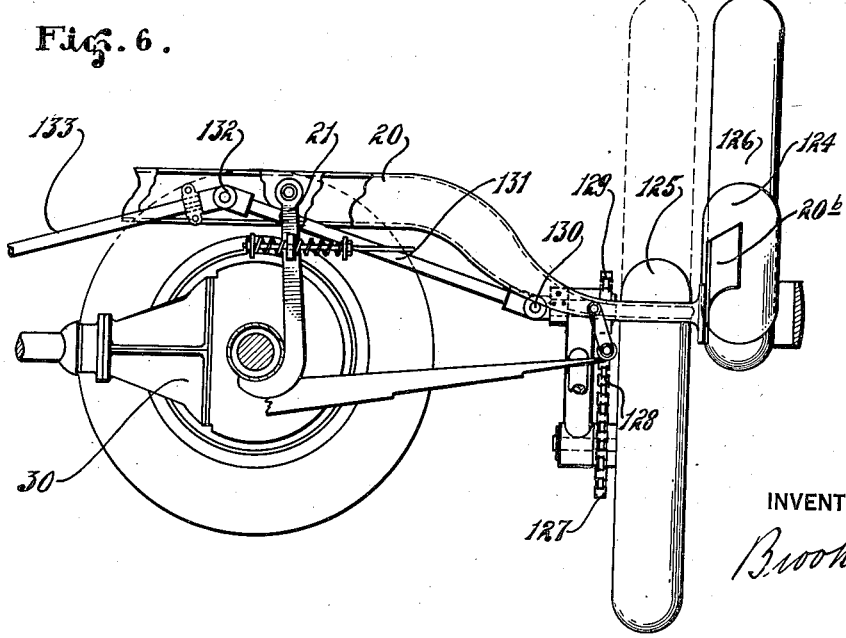
Fig. 6 is a partially cut-away view of the rear portion of a motor vehicle in side elevation through section 6—6 of Fig. 5, also showing the rear wheels of the vehicle supported on one only of the two spare tires and showing the retracted position of said spare tires in dotted line.

In Figs. 5 and 6 I have illustrated an alternative form which my invention may assume, in which a vehicle frame 20 and an axle housing 30 are linked together by the axle hooks 21 and 22 in any convenient manner, such as illustrated in Figs. 1 and 2. A hydraulic cylinder 120 is attached to lower one of the spare tires 125 from its retracted position in substantial axial alignment with the other spare tire 126, into ground engagement, to effect a lifting of the rear portion of the vehicle together with the rear vehicle wheels, out of contact with the ground. The spare tire 125 is illustrated in its vehicle lifted position in full line in Figs. 5 and 6. The mechanism for raising and lowering this spare tire 125 is similar to that described in my copending application entitled: "Vehicle lifting and traversing device", filed March 21, 1932, Serial Number 600,126, and may be either of the double acting hydraulic or of the retracting spring type or any other type of raising and lowering mechanism.

The driving mechanism for rotating the spare wheel when in the vehicle supporting position is similar to that illustrated in Fig. 5 of my copending application, Serial Number 535,380, previously referred to, wherein the wheel 125 carries a sprocket 127 in driving relation with a chain 128, which chain is in driving connection with a sprocket 129. The sprocket 129 is connected by means of a shaft and the universal joint 130 to the shaft 131, the universal joint 132, the shaft 133 and to some suitable power take-off, preferably from the transmission or drive shaft of the motor vehicle.

The spare tire 125 may be carried in a pair of saddles 123 and 124 to which are attached suitable clamping devices 123a and 124a for fastening said spare tire to said saddles 123 and 124. These saddles are rigidly attached to the vehicle chassis by means of the arms 20a and 20b of the vehicle frame. By this construction I have provided means whereby two spare tires may be carried by the motor vehicle, one of which tires is operable as part of a lifting and traversing device and the other spare tire is removable for interchange with the vehicle tires in case of puncture or accident. It is to be understood that in the event of two flat tires the spare tire 125 could be removed for interchange purposes with one of the vehicle wheels. A tire cover of any conventional design could be applied to the inactive spare tire 126 to improve the looks thereof or a double tire cover could be carried on the spare tire 125 also to cover effectively spare tire 125 when in its retracted position. It is also to be understood that when any other type of actuating mechanism for effecting the lowering and traversing of the spare tire 125 may be incorporated within the scope of this invention.

Figure 7:
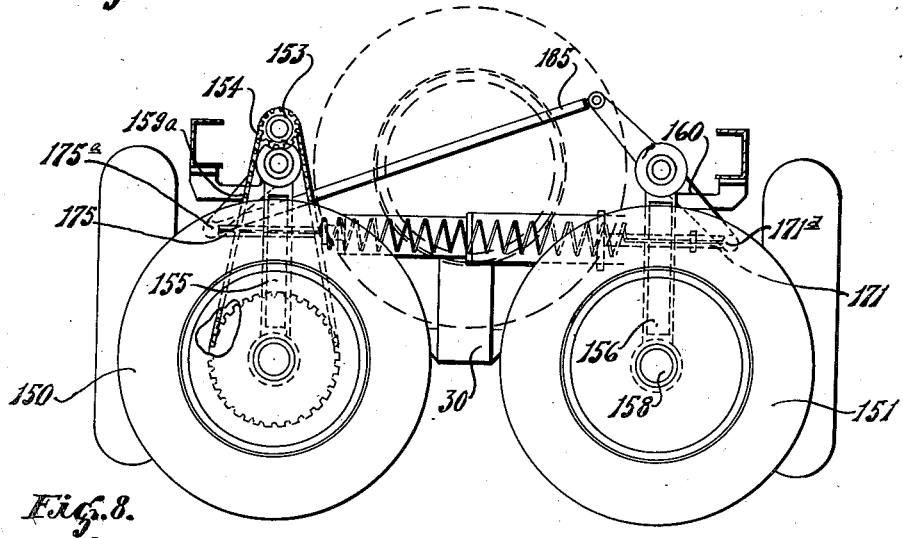
Fig. 7 is a rear elevation view, partly cut away of another form which my invention may assume, wherein the two spare tires may be lowered into ground engagement at the opposite sides of the vehicle center line as herein shown, while being so constructed as to occupy a tandem in active position, as illustrated by the dotted line.
Figure 8:
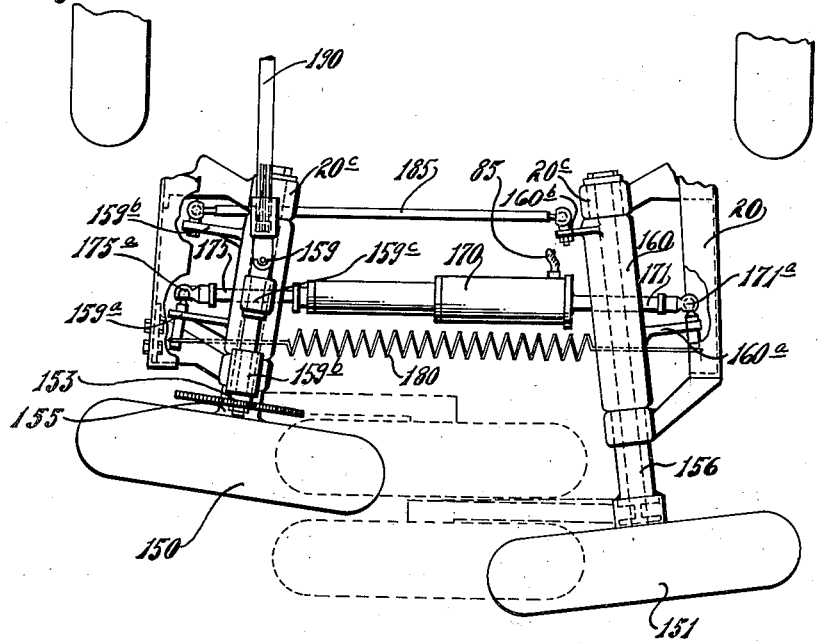
Fig. 8 is a plan view, partly cut away, showing the lifting mechanism employed in Fig. 7 with the spare tires shown in their ground engaging position.

In Figs. 7 and 8 I have illustrated a still further modification which my invention may assume in which I have a vehicle frame 20 connected to an axle housing 30 by suitable springs not here illustrated. There may be suitable axle hooks interconnecting said frame with said axle when said frame is to be elevated. These hooks and their actuating mechanism may be similar to that illustrated in Fig. 1. In this instance I have illustrated two spare tires 150 and 151, each mounted for rotation on the axles 157 and 158 respectively, which axles extend rearwardly from the lower ends of the arms 155 and 156 respectively. The upper ends of said arms carry extensions 159 and 160, respectively, which lie in the same respective planes as do the axles 157 and 158. However, said axles and said extensions are not parallel, but a projection of each will preferably strike a point approximately midway between the two front wheels of the vehicle, which is the point about which the rear portion of the vehicle rotates when the rear portion is supported and traversing on the spare tires.

The extension 160 is suitably pivotally attached to the brackets 20e and 20f of the vehicle frame and, likewise, the extension 159 is suitably pivoted to the frame brackets 20c and 20d. The aforementioned mounting of the spare tires 150 and 151 results in a controlled path of swing to a retracted position, as illustrated in dotted line on Fig. 7, wherein the two spare tires lie directly in back of each other with their axes falling on the frame of the vertical longitudinal plane of the motor vehicle. From this retracted position they are capable of being lowered into their vehicle supporting position as illustrated by full line in Figs. 7 and 8, wherein they support the vehicle at two points, one at each side of the vehicle center line respectively and in such a position that an extension of the axles 157 and 158 will meet at a point substantially mid-way between the two front wheels of the vehicle. To effect this raising and lowering operation I have provided a telescoping cylinder 170 which is connected to a suitable source of fluid pressure by means of a flexible pipe 85, in any well known manner. One end of the hydraulic cylinder is connected by means of an extension 171 to a ball and socket joint 171a, said ball and socket joint being also attached to an extension 160a. The piston rod 175 is connected at its outer end to a ball and socket joint 175a, which joint is attached to an arm 159a, which arm rigidly attached to the extension 159. A suitable retracting spring 180 is likewise attached to an extension of the ball and socket joints 171a and 175a, which spring is preferably capable of completely retracting the tires 150 and 151 into their inactive position with sufficient initial tension to maintain them safely in this position when the vehicle is normally encountering severe bumps. In order that both arms 155 and 156 will move in unison during the raising and lowering operation I have provided a tie rod 185 which is connected by suitable ball joints to arms 159b and 160b respectively. By the inter-connection of this tie rod 185 any motion of arm 155 will be accompanied by a similar motion in a counter direction of the arm 156 and vice versa. A sprocket 152, by means of the chain 154 is maintained in driving connection with a sprocket 153. The shaft 153a, which is rigidly connected to the sprocket 153 is suitably bearinged for rotation in arms 159c and 159d respectively. These arms position the shaft 153 in a parallel relationship to the axle 157 so that a driving relation may be maintained at all positions of the spare tire 150 between the sprockets 152 and 153.

It is to be noted that the distance between the shafts 153a and 157 are in fixed relation throughout the swing of the spare tire 150, due to the construction where both are bearinged in extensions of the arm 155. A suitable universal joint and spline shaft connect the shaft 153a with the shaft 190, which shaft 190 is preferably automatically engaged with some suitable driving mechanism as illustrated in my co-pending application, Serial Number 535,380, previously referred to.

It is to be understood that by slight modifications, any of the constructions illustrated in Figs. 5, 6, 7 and 8 could be driven by the mechanism illustrated in Figs. 1, 2, 3 and 4, entirely within the scope of this invention. In either of these constructions the lowering motion of the wheel from its inoperative position could cause an engagement with the extension of the pinion shaft by a slight modification of the construction illustrated.

Throughout this specification the term "spare tire" has been used to designate the spare tire as mounted at the rear of the motor vehicle. However, it is to be understood that the term is to include the spare wheel attached to the spare tire, when such is used for interchange with the vehicle wheels and tires.

While I have described and illustrated several embodiments of my invention, it will be apparent to those skilled in the art that various changes, additions, omissions and substitutions may be made therein without departing from the spirit and scope of my invention, as set forth in the accompanying claims.

Having thus described my invention, what I claim and desire to secure by Letters Patent is:

1. The combination with a motor vehicle of a structure mounted on said motor vehicle adapted to support two spare tires at the rear end of said vehicle, means for imparting movement to said structure to cause said tires to engage the ground at each side of the vehicle longitudinal center and lift two wheels of said vehicle out of engagement with the ground.

2. The combination with a motor vehicle of a structure mounted on said motor vehicle adapted to support two spare tires at the rear end of said vehicle, means for imparting movement to said structure to cause said tires to engage the ground and lift two wheels of said vehicle out of engagement with the ground, said spare tires being moved into ground engagement out of axial alignment with relation to each other.

3. The combination with a motor vehicle of a structure mounted on said motor vehicle adapted to support two spare tires at the rear end of said vehicle, means for imparting movement to said structure to cause said tires to engage the ground in non axial alignment with each other and lift two wheels of said vehicle out of engagement with the ground, said spare tires being carried in tandem relation to each other when in their inactive position at the rear of said vehicle.

4. The combination with a motor vehicle of a structure mounted on said motor vehicle adapted to support two spare tires at the rear end of said vehicle, means for imparting movement to said structure to cause said tires to engage the ground and lift a wheel of said vehicle out of engagement with the ground, each of said spare tires being moved into ground engagement at opposite sides respectively of the vehicle center line.

5. The combination with a motor vehicle of a structure mounted on said motor vehicle adapted to support two spare tires at the rear end of said vehicle, means for imparting movement to said structure to cause said tires to engage the ground and lift a wheel of said vehicle out of engagement with the ground, said spare tires being carried in tandem relation to each other when in their inactive position at the rear of said vehicle, the axis of said spare tires falling on the vertical plane through the vehicle center line when in their inactive position, said axis of each of said spare tires being at each side of said vertical plane when said spare tires are in their vehicle supporting position.

6. The combination with a motor vehicle of a structure mounted on said motor vehicle adapted to support two spare tires at the rear end of said vehicle, means for imparting movement to said structure to cause said tires to engage the ground and lift a wheel of said vehicle out of engagement with the ground, said spare tires being carried in tandem relation to each other when in their inactive position at the rear of said vehicle, the axis of said spare tires falling on the vertical plane through the vehicle center line when in their inactive position and positioned at each side of said center line when in their active position, an extension of the axis of said spare tires meeting at a point adjacent the front end of said vehicle when said wheels are in their vehicle supporting position.

7. The combination with a motor vehicle of a structure mounted on said motor vehicle adapted to support two spare tires at the rear end of said vehicle, means for imparting movement to said structure to cause said tires to engage the ground at each side of the vehicle longitudinal center and lift two wheels of said vehicle out of engagement with the ground, one of said spare tires being rotatable when in their vehicle raised position.

8. The combination with a motor vehicle of a structure mounted on said motor vehicle adapted to support two spare tires at the rear end of said vehicle, means for imparting movement to said structure to cause said tires to engage the ground at each side of the vehicle longitudinal center and lift two wheels of said vehicle out of engagement with the ground, one of said spare tires being rotatable by power when in their vehicle raised position.

9. The combination with a motor vehicle of a structure mounted on said motor vehicle adapted to support two spare tires at the rear end of said vehicle, means for imparting movement to said structure to cause said tires to engage the ground at each side of the vehicle longitudinal center and lift two wheels of said vehicle out of engagement with the ground, one of said spare tires being rotatable by engine power when in their vehicle raised position.

BROOKS WALKER.

Patent No. 2,005,173   Granted June 18, 1935

BROOKS WALKER

The above entitled patent was extended July 24, 1951, under the provisions of the act of June 30, 1950, for 6 years and 214 days from the expiration of the original term thereof.

*Commissioner of Patents.*